US012605762B2

(12) United States Patent
Daenicke et al.

(10) Patent No.: US 12,605,762 B2
(45) Date of Patent: Apr. 21, 2026

(54) THREE-DIMENSIONAL SCREEN PRINTING METHOD, COMPONENT PRODUCIBLE BY MEANS OF SAID METHOD, AND SCREEN PRINTING MASK

(71) Applicant: Rolls-Royce Deutschland Ltd & Co KG, Blankenfelde-Mahlow (DE)

(72) Inventors: Enrico Daenicke, Berlin (DE); Björn Hinze, Berlin (DE); Miklos Gäbler, Potsdam (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 655 days.

(21) Appl. No.: 18/012,014

(22) PCT Filed: Jun. 28, 2021

(86) PCT No.: PCT/EP2021/067650
§ 371 (c)(1),
(2) Date: Dec. 21, 2022

(87) PCT Pub. No.: WO2022/002832
PCT Pub. Date: Jan. 6, 2022

(65) Prior Publication Data
US 2023/0321721 A1 Oct. 12, 2023

(30) Foreign Application Priority Data

Jun. 30, 2020 (DE) ..................... 10 2020 117 176.5
Jun. 30, 2020 (DE) ..................... 10 2020 117 177.3

(51) Int. Cl.
B22F 7/02 (2006.01)
B22F 3/11 (2006.01)
(Continued)

(52) U.S. Cl.
CPC .............. B22F 7/02 (2013.01); B22F 3/1115 (2013.01); B22F 5/009 (2013.01); B22F 10/10 (2021.01);
(Continued)

(58) Field of Classification Search
CPC ................................. B22F 10/10; B22F 10/12
See application file for complete search history.

(56) References Cited

U.S. PATENT DOCUMENTS

| | | | |
|---|---|---|---|
| 6,444,167 B1 | 9/2002 | Shimodaira et al. | |
| 2016/0097295 A1 | 4/2016 | Allen | |
| 2018/0106154 A1* | 4/2018 | Baldwin | F01D 5/288 |

FOREIGN PATENT DOCUMENTS

| | | |
|---|---|---|
| DE | 102004057360 A1 | 6/2006 |
| DE | 102011013894 A1 | 9/2012 |

(Continued)

OTHER PUBLICATIONS

European Office Action dated Apr. 17, 2025 from counterpart European App No. 21736320.9.
(Continued)

*Primary Examiner* — Ricardo D Morales
(74) *Attorney, Agent, or Firm* — SHUTTLEWORTH & INGERSOLL, PLC; Timothy J. Klima

(57) ABSTRACT

The invention relates to a three-dimensional screen printing method for producing a green part from printing material for a powder metallurgical component, wherein the printing material contains a fraction of powder, more particularly metal powder or ceramic powder, and binder or consists of these materials, characterized in that a screen printing mask has a screen printing structure having openings for pressing the printing material through, the openings being partly undulate so that the green part at least partly has a three-dimensional undulate structure and/or undulate edges.

20 Claims, 5 Drawing Sheets

Figure 1:
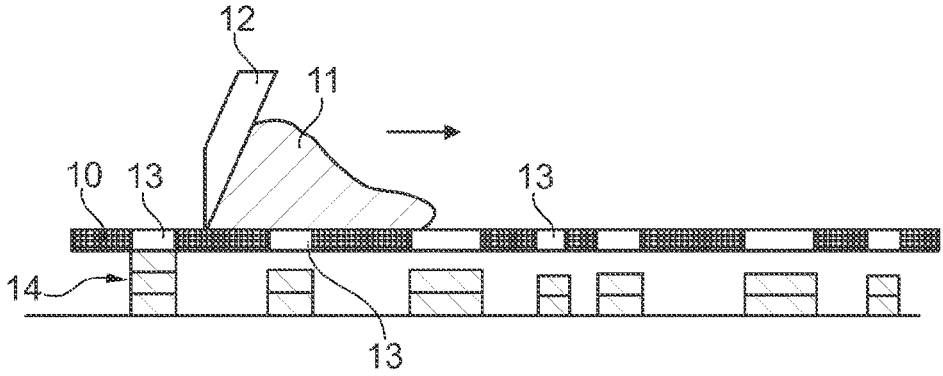

(51) Int. Cl.
| | |
|---|---|
| B22F 5/00 | (2006.01) |
| B22F 10/10 | (2021.01) |
| B33Y 10/00 | (2015.01) |
| B33Y 40/20 | (2020.01) |
| B33Y 80/00 | (2015.01) |
| B41F 15/34 | (2006.01) |

(52) U.S. Cl.
CPC ........ *B41F 15/34* (2013.01); *B22F 2005/005* (2013.01); *B33Y 10/00* (2014.12); *B33Y 40/20* (2020.01); *B33Y 80/00* (2014.12)

(56) References Cited

FOREIGN PATENT DOCUMENTS

| | | |
|---|---|---|
| DE | 102012215710 | 2/2014 |
| DE | 102015216491 B4 | 3/2022 |
| EP | 3825039 A1 | 5/2021 |

OTHER PUBLICATIONS

German Search Report dated Apr. 20, 2021 from counterpart German Patent Application No. 10 2020 117 176.5.

* cited by examiner

THREE-DIMENSIONAL SCREEN PRINTING METHOD, COMPONENT PRODUCIBLE BY MEANS OF SAID METHOD, AND SCREEN PRINTING MASK

This application is the National Phase of International Application PCT/EP2021/067650 filed Jun. 28, 2021 which designated the U.S.

This application claims priority to German Patent Application No. 10 2020 117 176.5 filed Jun. 30, 2020 and German Patent Application No. 10 2020 117 177.3 filed Jun. 30, 2020. Both applications are incorporated by reference herein.

The present disclosure relates to a three-dimensional screenprinting method, to a component producible therewith, and to a screenprinting mask having features as disclosed herein.

The production of green parts by means of screenprinting methods is fundamentally known. For instance, DE 10 2015 216 491 A1 describes the production of abradable seals by means of three-dimensional screenprinting as part of a powder metallurgy method. This especially concerns the production of a green part having hollow structures and vertical wall structures, such as honeycomb structures.

Abradable seals in turbo machines, for instance in aircraft gas turbines, are subject to exceptional demands. When a rotor hits a labyrinth seal, the latter should as far as possible not smear, not break and not generate high temperatures when the rotor rubs against it, which leads to stress on the rotating component.

The green part as starting point for the powder metallurgy method is created layer by layer by screenprinting. Since the layers are comparatively thin, such a method is also referred to as the 2.5-D screenprinting method.

Screenprinting involves working with flat layers, such that, on conclusion of the layer-by-layer printing, what is left is a green part having flat outer contours (for example in the form of a cuboidal abradable seal). The vertical wall structures are then disposed within the green part, for example in the form of honeycombs.

If such a green part is to be shaped, for example by a curve, this may result in cracks or defects in the green part since the walls of the green part and/or the vertical wall structures are shaped by the curving. Tensile stress is exerted at the outer radius of the curve, which can lead to cracks. The material is compressed at the inner radius of the curve.

The problem addressed is therefore that of specifying efficient methods of producing a green part—and hence a component.

In a first aspect, a three-dimensional screenprinting method having the features of claim 1 is provided.

The green part is produced by the three-dimensional screenprinting method from print material in a powder metallurgy method, wherein the print material includes a portion of powder, especially ceramic or metal powder, and binder, or consists of these materials. The green part, by the powder metallurgy method, is ultimately used to produce a component which is usable for example, in a gas turbine as liner.

A screenprinting mask having a screenprinting structure is used here, wherein the screenprinting mask has openings for the print material to be pushed through and the openings are partly in wave-shaped form, such that the green part at least partly has a three-dimensional wavy structure and/or wavy edges. The wavy structure is within the component and replaces structures that are fundamentally known, for example honeycomb structures having straight walls. It is thus especially also possible to use honeycomb structures having corrugated walls. Alternatively or additionally, the edges of the component are also in wave-shaped form.

Such a green part may, for example, be curved, i.e. shaped, about one or more axes, without occurrence of expansion cracks. In expanded regions, the wave-shaped structures are pulled further apart. In compressed regions, the waves are pushed together. This can also be referred to as a "concertina effect". It is thus possible to efficiently produce green parts, and ultimately components, having complex shapes.

In a second aspect, a three-dimensional screenprinting method is disclosed herein.

The green part is produced by the three-dimensional screenprinting method from print material in a powder metallurgy method, wherein the print material includes a portion of powder, especially ceramic or metal powder, and binder, or consists of these materials. The green part, by the powder metallurgy method, is ultimately used to produce a component which is usable for example, in a gas turbine as liner.

In this case, a green component is produced from print material for a powder metallurgy component, and the green part after production is shaped at temperatures between 30 and 100° C., since the component is likewise to be correspondingly shaped. In particular, the temperature may be below 90° C., especially between 30 and 60° C. Since the green parts have a water content, the water is not brought to boiling (at atmospheric pressure).

In particular, the temperature may be constant. For efficient shaping, the shaping can be effected by means of a mold, in which case the shaping time may especially be within a range between 1 and 30 seconds.

The embodiments specified hereinafter may be employed for both the aforementioned aspects.

In one embodiment, the wavy structure takes the form of a honeycomb or a rhombus. It is thus possible, for example, for honeycomb structures or rhombus structures that are known per se to have at least partly wave-shaped walls.

In this case, the screenprinting structure may have a multitude of wave-shaped openings that are arranged at least partly parallel to one another and which are especially at the same distance from one another and/or are arranged at least partly in phase with one another. What is meant here by a wave-shaped opening is that at least a section of the opening is in wave-shaped form. Such an embodiment may then have a very regular pattern in which the resulting green part has equidistant wave-shaped structures or, for example, rhombus structures with wave-shaped walls. In principle, however, it is possible that the wave-shaped structures are of nonuniform construction. The above-described extensibility and compatibility can also be achieved when there are wave-shaped structures over part of the green body, which may also differ in shape with respect to one another.

In a further embodiment, the wave-shaped openings of the screenprinting structure have a constant wavelength, where the wavelength is especially greater than 50 μm and less than 5000 μm. By the use of multiple wave-shaped structures of this kind, it is possible to achieve a similar structure in functional terms, the known honeycomb structures. When the openings of the screenprinting structures have these dimensions, the dimension of the green part and ultimately of the powder metallurgy component are also within this range.

It is also possible for the width of at least one wave-shaped opening in the screenprinting mask to be larger than 50 μm and smaller than 5000 μm, such that comparatively thin-wall wave-shaped structures are producible in the green part.

In a further embodiment, at least one wavy structure of the green part has a height in vertical direction between 1 and 20 mm, especially between 2 and 10 mm, especially 5 mm.

It is also possible for at least one wave-shaped opening of the screenprinting mask and at least one wavy structure of the green part to be at least partly in sinusoidal form in horizontal section. A wavy form should be understood to be more general in the context than a mathematically exact sinusoidal form. For example, the wave-shaped structures may, for example, have straight sections without losing their wave-shaped character.

In a further embodiment, the green part is shaped after production since the component is likewise to be correspondingly shaped. The shaping here may be effected about at least one axis of curvature. Depending on the position and number of axes of curvature, it is possible to produce more complex-shaped green parts. For instance, the green part may especially be shaped about two axes. In particular, the green part may be shaped so as to cause a depression or a bulge. In any case, the shaping in the green part—as described above—is absorbed by the wave-shaped structures.

Accordingly, shaping may result in stretching and/or compression in the green part, which is compensated for at least by parts of the wavy structure of the green part through adjustment of the wavelength.

In one embodiment, the unshaped green part is essentially cuboidal (particularly with regard to the outer shape), and the shaping of the green part comprises bending about an axis of curvature, wherein the axis of curvature is in a plane that lies parallel or at an incline relative to a lateral face of the green part.

In one embodiment of the method, the shaping is followed by debindering and sintering, especially under reduced pressure.

In one embodiment, the metal powder used is a nickel-containing metal powder, especially a CoNiCrAlY powder.

The shaping of the green part is dependent on the thermal conditions in particular. For instance, the shaping can especially be effected at a pressure between 0.8 and 1.2 bar, especially at 1 bar, since humidity is controllable there without any great difficulty. The green part can also be shaped at a relative humidity of 60% to 100%, especially at a relative humidity between 80% and 100%.

The object is also achieved by a component producible by at least one of the embodiments of the three-dimensional screenprinting method. Such a component has at least one wavy structure. In the course of shaping of the component in the production process, or if appropriate also in operation, the wavy structure can assume elongations and/or compressions in a controlled manner, such that cracks or material compressions are avoided or at least minimized. A possible field of use is a sealing surface, especially in an abradable seal in a turbo machine or as part of an abradable seal for a turbo machine. An abradable seal may be executed as a labyrinth seal.

In one embodiment, the component is at least partly in dish form or in conical form. Such components may preferably be used for lining of ducts. In this case, for example, the radius of curvature may be between 50 mm and 2000 mm, especially between 100 and 200 mm.

The object is also achieved by a screenprinting mask which is set up and designed for use in at least one of the screenprinting methods disclosed herein.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

Figure 1A:
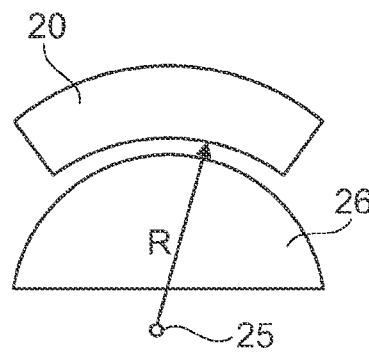
Figure 1B:
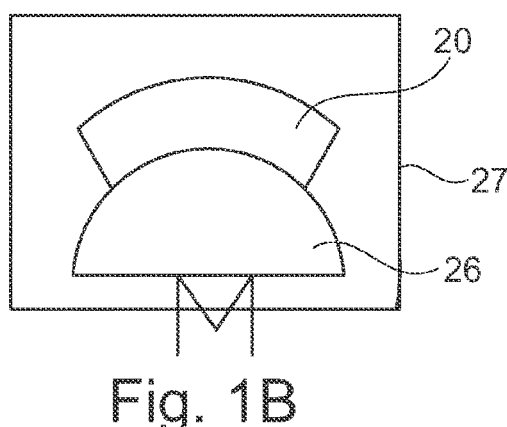
Figure 1C:
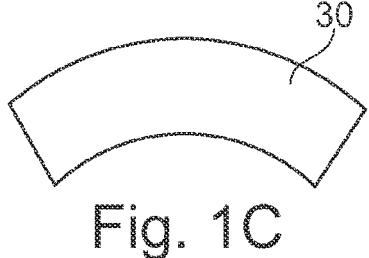
Figure 2:
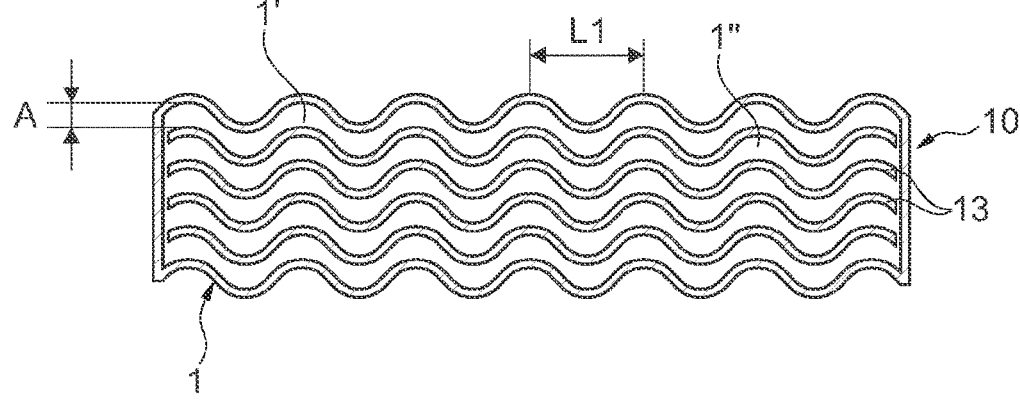
Figure 3:
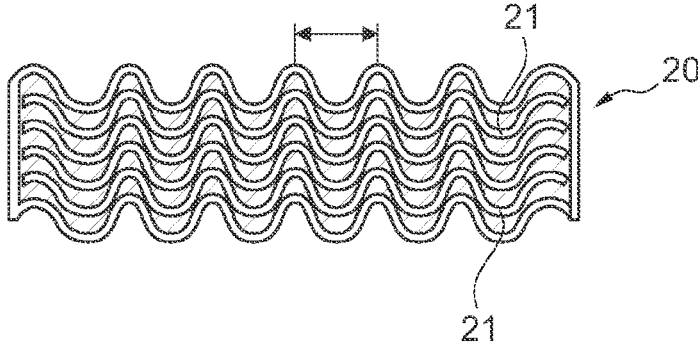
Figure 3A:
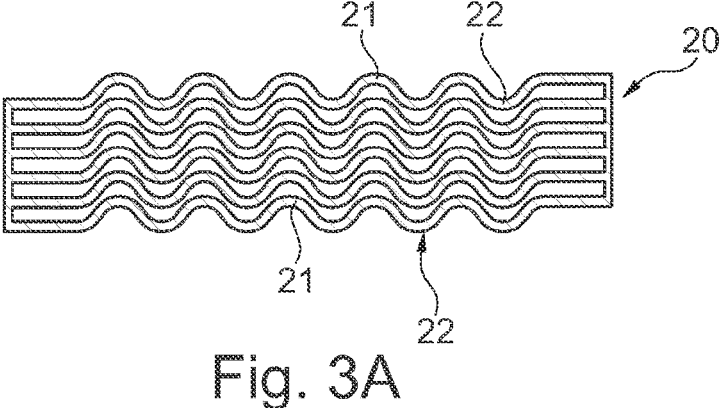
Figure 4:
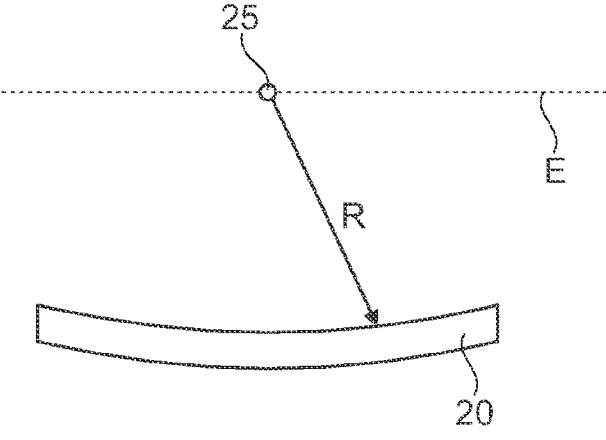
Figure 4A:
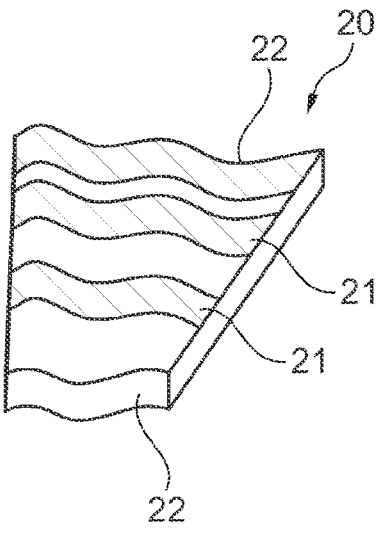

Embodiments will now be described by way of example with reference to the figures; the figures show:

FIG. 1 a schematic diagram of a fundamentally known three-dimensional screenprinting method with which a green part is produced;

FIG. 1A a schematic diagram of a shaping of the green part;

FIG. 1B a schematic diagram of a debindering and sintering of the green part;

FIG. 1C a schematic diagram of the shaped component;

FIG. 2 a schematic top view of an embodiment of a flat screenprinting mask for production of a green part;

FIG. 3 a schematic top view of an embodiment of a shaped green part, produced with a screenprinting mask according to FIG. 2;

FIG. 3A a schematic top view of a modification of the embodiment of the green part according to FIG. 3;

FIG. 4 a schematic side view of a green part shaped about an axis;

FIG. 4A a schematic three-dimensional view of an embodiment of a shaped green part.

Before hereinafter describing embodiments of a screenprinting method and of the green parts 20 produced therewith and embodiments of a screenprinting method with thermal shaping of a green part 20 produced therewith, the fundamental procedure in three-dimensional screenprinting is described with reference to FIG. 1. This refers to a green part 20 (see FIGS. 3, 3A, 4, 4A) which is produced in the course of a powder metallurgy method for an abradable seal (labyrinth seal) for an aircraft engine. In principle, it is alternatively possible to produce other green parts by the embodiments described here.

First of all, print material 11—here a mixture of metal powder and binder for the production of the green part 20—is coated over the screenprinting mask 10 in arrow direction with the aid of a squeegee 12.

The screenprinting mask 10 has a multitude of openings 13 through which the print material 11 is pushed. In the side view according to FIG. 1, seven openings 13 are apparent, through which the print material 11 is pushed.

Below the screenprinting mask 10, a layer 14 of the print material 11 is formed every time material is pushed through. The individual layers are symbolized here by boxes.

In the diagram of FIG. 1, two complete layers 14 have been produced; the third layer 14 is currently being produced. By virtue of a vertical movement of the screenprinting mask 10 upward, a vertical structure—the green part 20—is gradually produced by screenprinting. Thus, this method is an additive manufacturing method.

FIG. 1A shows schematically that the production of a green part 20 formed from layers 14 is followed by shaping thereof. In the diagram, it is bent by means of a molding 26 about an axis of curvature 25 with a constant radius of curvature R, so as to form a dish-shaped green part 20.

Alternatively, as shown in FIG. 1A, even after the production of a green part 20 formed from layers 14, the latter is shaped thermally. The shaping temperature in the example shown here is between 30 and 100° C., but in particular below 90° C., since water present does not boil at atmospheric pressure.

Other important factors are the pressures and relative humidity. Pressures are advisably between 0.8 and 1.2 bar, especially 1 bar, and relative humidities from 60% to 100%, especially from 80% to 100%.

The shaping here is executed by means of a molding 26, i.e. the green part 20 is bent about an axis of curvature 25 with a constant radius of curvature R, so as to form a dish-shaped green part 20. In alternative embodiments, it is also possible to use a concave shape as molding 26, or it is possible not undertake any conical shaping. The shaping time here may especially be between 1 and 30 seconds.

The embodiments described hereinafter are applicable to the screenprinting method, and to the screenprinting method with thermal forming.

This is followed by debindering and sintering of the green part 20 in an oven 27 (FIG. 1B). On conclusion of this step, the finished component 30 is present, i.e. a curved dish-shaped component 30. Several of these curve components 30 may be combined, for example by hard soldering, to give an annular abradable seal. It is thus also possible for the component 30 produced to be part of a part assembled from multiple parts.

The embodiments of three-dimensional screenprinting that are addressed here relate more particularly to the production of sealing surfaces as component 30, as used in turbo machines (i.e. rotary machines). Such abradable seals 30 are used, for example, as liners 30 in air ducts of a gas turbine engine on aircraft. In this case, they form labyrinth seals together with sealing lips (for example on disks).

As mentioned at the outset, it is known that these abradable seals can be formed with honeycomb structures, in which case the open ends of the honeycombs point toward the rotors. When, for example, a honeycomb structure is arranged in a rectangular abradable seal, the formation, for example monoaxial curvature of the abradable seal, leads to stresses in the honeycomb component. The material is stretched at some points in the region of the greatest radius of curvature R to such an extent that there is not enough material; the result is cracks, which are unwanted. On the opposite side (i.e. region of the smallest radius of curvature R), bending of the green part 20 results in compression of the material, such that there are unwanted material deformations.

As explained hereinafter, the honeycombs are to be extended or replaced by differently shaped vertical structures in the component 30.

Since abradable seals are used in a gas turbine engine, for example for lining of the air-conducting ducts, this problem is of practical relevance.

FIG. 2 shows an embodiment of a screenprinting mask 10 in a top view, which is used for the production of a green part 20 and ultimately of a corresponding component 30. The green part 20 (see FIG. 3) is to be shapable without significant cracking.

In the embodiment of the screenprinting mask 10 according to FIG. 2, tearing and compression of the material are avoided in that the vertical structures 21 (see FIG. 3) in the green part 20 are in wave-shaped form.

For this purpose, the flat screenprinting mask 10 has openings 13 having a wavy structure 1 having multiple wave openings 1', 1" arranged parallel to one another. When metal powder and binder as print material 11 (see FIG. 1) are pushed through the wave openings 1', 1', the result is a wave-shaped material layer 14 which becomes part of the green part 20 (see FIG. 3).

By means of a movement upward, it is then possible to apply a further material layer 14 to the previously produced wavy structure 21 of the green part 20. A wavy structure 21 is thus formed as a vertical wall structure in the direction of the plane of the drawing. The behavior of the wavy structure 21 of the green part 20 thus produced under shaping will be described hereinafter.

In the embodiment of the screenprinting mask 10 shown, the wave-shaped openings 1', 1" take the form of uniform, roughly sinusoidal wave shapes each having a width A. The wave-shaped openings 1', 1" are formed at the same distance from one another and are in phase, meaning that the wave peaks and troughs are each on a straight line in top view. It is also possible for the two long edges of the screenprinting mask 10—at the top and bottom in FIG. 2—to have a wavy structure.

For typical applications, the width A of the wave-shaped openings 1', 1" is between 50 and 200 μm, meaning that the wall thicknesses of the vertical wavy structures 21 in the green part 20 are likewise within this range.

The wavelength L1 of the wave-shaped openings 1', 1" here is about 2000 μm, and so it is also possible for the wavelength of the wave-shaped structures 21 of the green part 20 to be within this range.

In alternative embodiments of the screenprinting mask 10, the openings 1', 1" are only partly wave-shaped. For example, it is possible for the openings 13 each to be straight at the lateral edges of the screenprinting mask and for there to be wavy structures 1', 1" only in the middle. This would mean that the resulting green part 20 would likewise have a wavy structure 21, but which is wavy only in one subregion or else multiple subregions, as shown by way of example in FIG. 3A. The wave shape may also differ at least partly from a pure sinus shape and, for example, have linear or differently curved sections.

It is also not obligatory for the wave-shaped openings 1', 1" all to lie in phase; the openings 1', 1" may also be phase-shifted relative to one another.

Moreover, it is also not obligatory for the wave-shaped openings 1', 1" all to have the same width A. It is also possible to produce green parts 20 having vertical wave-shaped structures 21 having different wall thicknesses.

In any case, it is important that the screenprinting mask 10 at least partly has a wave-shaped screenprinting structure 1 having openings 1', 1", 13 for the print material 11 to be pushed through, such that the green part 20 produced thereby at least partly (in sections) has a three-dimensional wave-shaped structure 21.

Such a green part 20 is shown in a top view in FIG. 3, wherein the green part 20 has been shaped, since the resulting component 30—as part of an abradable seal (not shown here)—is likewise curved.

The wave-shaped structure 21 is essentially elongated in the example of FIGS. 2, 3, 3A. It is alternatively possible that the wave-shaped structure 21 is imparted to a honeycomb structure or a rhombus structure. This means that the walls of the honeycombs or of the rhombuses have at least partly wave-shaped sections, i.e. the openings in the screenprinting mask have at least partly wave-shaped structures. Even such a honeycomb or rhombus structure can make use of the above-described concertina effect when the structure is bent or compressed.

FIG. 4 shows a side view of this green part 20, in which the green part 20 has been bent about an axis of curvature 25, as executed in the powder metallurgy production method (see FIG. 1A). Further possible shaping options are still to be discussed.

The green part 20 has straight outer edges 22 at the two lateral edges. The two opposite long sides are in wavy form.

The wave-shaped structure 21 in the green part 20 has a height in vertical direction (i.e. out of the plane of the drawing) between 1 and 20 mm, especially between 2 and 10 mm, with respect to the base.

The shaping of the green part 20 (bending out of the plane of the drawing in FIG. 3) makes the longitudinal extent of the green part 20 smaller than the longitudinal extent of the flat screenprinting mask 10. The effect of this is that the wave-shaped structures 21 in the case of this bending are short and that the vertically upper end (i.e. in the region of the smaller radius of curvature R) of the wave-shaped structure 21. The wavelength L2 of the wave-shaped structures 21 is then less than the wavelength L1 of the wave-shaped openings 1', 1' of the screenprinting mask 10 (see FIG. 2).

At the base (invisible here) (i.e. the region of the greatest radius of curvature R) of the vertical wave-shaped structure 21, the green part 20 is stretched, i.e. the wavelength there becomes greater than the wavelength L1 of the wave-shaped openings 1', 1" of the screenprinting mask 10.

The wave-shaped structure 21 of the green part is formed sufficiently generously in this mode of shaping that there are no cracks or compressions, or these effects are at least minimized.

When the wave-shaped structure 21 is stretched, the wavelength of the structure simply increases since there is enough material in the green part 20 to follow this shaping. At the points where there is compression, the wavelength is correspondingly shortened.

This could also be referred to as a "concertina effect". It is thus possible—especially without altering the composition of the print material 11—to prevent damage to the green part 20 solely by structural geometry measures.

As described above, this green part 20 was produced by a three-dimensional screenprinting method, with formation of the green part 20 layer by layer. In the embodiment of the screenprinting method described so far, the same print material 11 is used throughout the process. The layers 14 from which the wave-shaped structures 21 of the green part 20 are made each have the same composition of metal powder and binder (and possibly further substances, for example water). But this need not necessarily be the case. In alternative embodiments, different print material 11 may be used for different layers 14. It is thus possible, for example, to form a wavy structure 21, the properties of which vary with height. For instance, it is possible to apply more brittle material by printing at the tip (i.e. the last layer) than in lower layers.

FIG. 4 shows a schematic of a side view of a green part 20, which is shaped about an axis of curvature 25, i.e. bent. The radius of curvature R is shown in FIG. 4. The axis of curvature 25 is in a plane E that lies parallel to one of the unshaped side compartments 22 of the green part 20. This means that the green part 20 is bent in a dish shape and has the same radius of curvature R throughout. The cuboidal green part 20 becomes a dish-shaped green part 20 corresponding to part of the circular cylindrical wall.

The green part 21 may alternatively be shaped in some other way. If, for example, the axis of curvature 25 is tilted relative to the plane E, bending of the green part 20 about this axis of curvature 25 which is oblique in space results in the production of a cone-shaped green part 20, and hence also a component 30. This is shown in schematic form in FIG. 4A, which shows a cone-shaped green part 20 with wave-shaped structures 21 and wave-shaped edges 22.

In principle, it is also possible to shape the green part 20 in a more complex manner, in that more than one axis of curvature 25 is used. It is also possible for the green part 20 to take the form of a depression or elevation, each of which is formable in a soot-free and compression-free manner, since they have wave-shaped structures 21.

LIST OF REFERENCE SYMBOLS

1 wave-shaped screenprinting structure
1', 1" wave-shaped openings of the screenprinting structure
10 screenprinting mask
11 print material
12 squeegee
13 opening in screenprinting mask
14 layer produced
20 screen-printed green part
21 wave-shaped structure in green part
22 edge of the green part
25 axis of curvature
26 molding
27 vacuum chamber
30 component
A width of wave-shaped openings in screenprinting mask
E plane in which the axis of curvature lies
L1 wavelength in the unshaped state
L2 wavelength in the shaped state
R radius of curvature

The invention claimed is:

1. A three-dimensional screenprinting method for production of a green part from print material for a powder metallurgy component, comprising:
   providing that the print material includes a portion of metal powder or ceramic powder, and binder,
   providing a screenprinting mask with a screenprinting structure with openings for the print material to be pushed through,
   forming the green part by pushing the print material through the openings;
   wherein the openings are at least partly wave-shaped, such that the green part has an at least partial three-dimensional wavy structure and/or wavy edges.

2. The three-dimensional screenprinting method as claimed in claim 1,
   wherein the green part after production is shaped at temperatures between 3° and 60° C., wherein the temperature remains constant and/or the shaping is performed with a mold for between 1 to 30 seconds.

3. The three-dimensional screenprinting method as claimed in claim 1, wherein the green part has a wavy structure shaped as a honeycomb or a rhombus.

4. The three-dimensional screenprinting method as claimed in claim 1, wherein the screenprinting structure has a plurality of wave-shaped openings that are arranged at least partly parallel to one another and which are at a same distance from one another and/or are arranged at least partly in phase with one another.

5. The three-dimensional screenprinting method as claimed in claim 1, wherein at least one of the openings is wave-shaped with a constant wavelength over a longitudinal extent thereof, where the wavelength is greater than 50 μm and less than 5000 μm.

6. The three-dimensional screenprinting method as claimed in claim 1, wherein at least one of the openings is wave-shaped with a width of the opening being greater than 50 μm and less than 5000 μm.

7. The three-dimensional screenprinting method as claimed in claim 1, wherein the green part has at least one wavy structure with a height of between 2 and 10 mm.

8. The three-dimensional screenprinting method as claimed in claim 1, wherein the green part has at least one wavy structure; wherein at least one of the openings and the at least one wavy structure of the green part are at least partly in sinusoidal form in horizontal section.

9. The three-dimensional screenprinting method as claimed in claim 1, and further comprising further shaping the green part after the forming.

10. The three-dimensional screenprinting method as claimed in claim 8, wherein the further shaping is performed about at least one axis of curvature.

11. The three-dimensional screenprinting method as claimed in claim 9, wherein the green part is shaped about two axes, to cause a depression or a bulge in the green part.

12. The three-dimensional screenprinting method as claimed in claim 9, wherein the green part has at least one wavy structure and the shaping results in extension and/or compression at least of parts of the at least one wavy structure, which is compensated for by adjusting a wavelength of the at least one wavy structure.

13. The three-dimensional screenprinting method as claimed in claim 9, wherein the green part prior to the further shaping is essentially cuboidal and the further shaping of the green part comprises bending the green part about an axis of curvature, wherein the axis of curvature is in a plane that lies parallel or at an incline relative to a lateral face of the green part.

14. The three-dimensional screenprinting method as claimed in claim 9, wherein the further shaping is followed by debindering and sintering, under reduced pressure.

15. The three-dimensional screenprinting method as claimed in claim 1, wherein a metal powder is used, and the metal powder is a CoNiCrAlY powder.

16. The three-dimensional screenprinting method as claimed in claim 9, wherein the further shaping is performed at a pressure between 0.8 and 1.2 bar.

17. The three-dimensional screenprinting method as claimed in claim 1, wherein the further shaping is performed at a relative humidity between 80% and 100%.

18. The three-dimensional screenprinting method as claimed in claim 1, wherein the green part is subjected to further shaping, debindering and sintering to form at least part of an abradable seal for a turbo machine.

19. The three-dimensional screenprinting method as claimed in claim 1, wherein the seal is at least partly in dish form or in conical form.

20. The three-dimensional screenprinting method as claimed in claim 1, wherein a radius of curvature of the seal is between 100 and 200 mm.

* * * * *